(12) United States Patent
Peng (10) Patent No.: US 12,150,428 B2
(45) Date of Patent: Nov. 26, 2024

(54) FLIP-TYPE CAT LITTER BOX

(71) Applicant: Weiyong Peng, Taizhou (CN)

(72) Inventor: Weiyong Peng, Taizhou (CN)

( * ) Notice: Subject to any disclaimer, the term of this patent is extended or adjusted under 35 U.S.C. 154(b) by 0 days.

(21) Appl. No.: 18/744,110

(22) Filed: Jun. 14, 2024

(65) Prior Publication Data
US 2024/0324544 A1 Oct. 3, 2024

(51) Int. Cl.
*A01K 1/01* (2006.01)
(52) U.S. Cl.
CPC .................. *A01K 1/0107* (2013.01)
(58) Field of Classification Search
CPC ....... A01K 1/0107; A01K 1/114; A01K 1/011
See application file for complete search history.

(56) References Cited

U.S. PATENT DOCUMENTS

| | | | | |
|---|---|---|---|---|
| 6,135,057 | A * | 10/2000 | Cummings | A01K 1/0107 119/170 |
| 10,638,721 | B2 * | 5/2020 | Liang | E05B 63/14 |
| 2001/0032544 | A1 * | 10/2001 | Taylor | A01K 1/0107 96/19 |
| 2007/0240647 | A1 * | 10/2007 | Dietz | A01K 1/03 119/482 |
| 2013/0167777 | A1 * | 7/2013 | Sweetman | A01K 1/0107 119/165 |
| 2015/0122189 | A1 * | 5/2015 | Sweetman | A01K 1/0107 119/165 |
| 2023/0210083 | A1 * | 7/2023 | Noh | A01K 1/0107 119/163 |

FOREIGN PATENT DOCUMENTS

| | | | | |
|---|---|---|---|---|
| CN | 113973732 | A * | 1/2022 | |
| CN | 114375850 | A * | 4/2022 | A01K 1/0047 |
| EP | 2113168 | A2 * | 11/2009 | A01K 1/0107 |
| KR | 20210156619 | A * | 12/2021 | |

\* cited by examiner

*Primary Examiner* — Monica L Perry
*Assistant Examiner* — Alanna K Peterson
(74) *Attorney, Agent, or Firm* — Daniel M. Cohn; Howard M. Cohn (57) ABSTRACT

The flip-type cat litter box includes a cat litter box assembly and a purification device. The cat litter box assembly includes a stainless steel bottom bowl and a top cover of a cat litter box that is disposed on a top of the stainless steel bottom bowl. A pedal is movably embedded on the top cover of the cat litter box, and the pedal is internally provided with a through-hole. After a cat relieves the bowels in the stainless steel bottom bowl and leaves, operations of sterilization and deodorization are performed immediately via an anion generator, an ultraviolet light, and a sensor. This effectively resolves a problem of bacteria and odor of the cat litter box, so that the using is more sanitary. A user toggles the latch catch body to unlock the pedal and flips the pedal upward, to enable the pedal to keep tilted on a top cover of a cat litter box. In addition, a transparent door and the pedal are folded together.

1 Claim, 8 Drawing Sheets

FLIP-TYPE CAT LITTER BOX

TECHNICAL FIELD

The present disclosure relates to the technical field of pet products, and in particular to a flip-type cat litter box.

BACKGROUND

A cat litter box is mainly used as a toilet supply for a pet cat, and an appliance that is easy to clean up the urine and feces of the pet. Therefore, the cat litter box is essential for people who like to keep pets. A conventional cat litter box has a simple structure. Basically, a layer of cat litter is paved in the cat litter box, and the pet cat picks up the cat litter for covering after defecating every time. People need to regularly clean up the cat litter box.

However, for the existing cat litter box, odor is removed by covering the urine and feces of the cat with only cat litter. As a result, cleaning effect is poor, and people need to regularly clean up the cat litter box. If people do not clean up in a timely manner, the odor affects indoor environments, and bacteria are bred, which triggers the pet to fall ill. This brings serious troubles to the user.

SUMMARY

To achieve the above objective, the present disclosure provides the following technical solutions: A flip-type cat litter box includes a cat litter box assembly and a purification device. The cat litter box assembly includes a stainless steel bottom bowl and a top cover of a cat litter box that is disposed on a top of the stainless steel bottom bowl. A pedal is movably embedded on the top cover of the cat litter box, the pedal is internally provided with a through-hole, and a transparent door is hinged at a bottom of one end of the pedal.

The purification device includes a purifier bottom shell and a magnet that is disposed on a side of the purifier bottom shell. The purifier bottom shell is attached to a side of an inner wall of the top cover of the cat litter box via the magnet, and an anion generator and a sensor are disposed inside the purifier bottom shell.

As a preferred technical solution of the present disclosure, a connection hole is provided on a top of the top cover of the cat litter box, the pedal is movably embedded inside the connection hole, a door hole is provided on a surface of the top cover of the cat litter box, and a bottom end of the transparent door extends inside the door hole.

As a preferred technical solution of the present disclosure, lock holes are provided on both sides of one end of the connection hole, and positioning holes are provided on both sides of the other end of the connection hole.

As a preferred technical solution of the present disclosure, rotary shafts are disposed on both sides of the pedal, the two rotary shafts are respectively stuck into two positioning holes, and the rotary shafts are L-shaped.

As a preferred technical solution of the present disclosure, two latch catch covers are disposed at a bottom of the one end of the pedal, and a latch catch body is movably disposed between the latch catch cover and the pedal.

As a preferred technical solution of the present disclosure, a lock pin that is inserted with a lock hole is disposed at one end of the latch catch body, and a latch catch slot is provided on a top of the other end of the latch catch body, and a latch catch hole corresponding to the latch catch slot is provided on a top of the one end of the pedal.

As a preferred technical solution of the present disclosure, an arc slot is provided on a top of the latch catch cover, a spring is movably embedded inside the arc slot, and a clamping slot that is clamped with the spring is provided at a bottom of the latch catch body.

As a preferred technical solution of the present disclosure, a plurality of corrugated strips that are located on a side of the through-hole are disposed on a top of the pedal, the pedal is internally provided with an elongated hole that is located between two adjacent corrugated strips, and a plurality of reinforcing ribs that are staggered from the corrugated strips are disposed at the bottom of the pedal.

As a preferred technical solution of the present disclosure, a purifier face cover is disposed on the side of the purifier bottom shell, the purifier face cover is internally provided with a plurality of ventilation holes, and one end of the sensor penetrates through the purifier face cover and extends inside the top cover of the cat litter box.

As a preferred technical solution of the present disclosure, a charging switch circuit board and a battery that is electrically connected with the charging switch circuit board are disposed inside the purifier bottom shell, and a charging interface and a switch button that correspond to the charging switch circuit board are disposed on the side of the purifier bottom shell.

Compared with the prior art, the flip-type cat litter box provided by the present disclosure has the following beneficial effect:

According to the flip-type cat litter box, after a cat relieves the bowels in the stainless steel bottom bowl and leaves, operations of sterilization and deodorization are performed immediately via an anion generator and a sensor. This effectively resolves a problem of bacteria and odor of the cat litter box, so that the using is more sanitary. A user toggles the latch catch body to unlock the pedal and flips the pedal upward, to enable the pedal to keep tilted on a top cover of a cat litter box. In addition, a transparent door and the pedal are folded together. Therefore, operating space of the user is greatly improved, and the user can easily clean up cat litter and cat feces in the stainless steel bottom bowl. Odor and the cat feces are not easy to left in the stainless steel bottom bowl, so that the user can easily clean up the stainless steel bottom bowl, and the using is more sanitary.

Reference numerals: 1: cat litter box assembly; 11: stainless steel bottom bowl; 12: top cover of cat litter box; 121: connection hole; 122: door hole; 123: lock hole; 124: positioning hole; 13: pedal; 131: through-hole; 132: rotary shaft; 133: latch catch hole; 134: corrugated strip; 135: elongated hole; 136: reinforcing rib; 14: transparent door; 15: latch catch cover; 151: arc slot; 16: latch catch body; 161: lock pin; 162: latch catch slot; 163: clamping slot; 17: spring; 2: purification device; 21: purifier bottom shell; 211: charging interface; 212: switch button; 22: purifier face cover; 23: magnet; 24: anion generator; 25: sensor; 26: ventilation hole; 27: charging switch circuit board; 28: battery.

DETAILED DESCRIPTION OF EMBODIMENT

The technical solutions in embodiments of the present disclosure are clearly and completely described below with reference to the accompanying drawings in the embodiments of the present disclosure. Apparently, the described embodiments are merely a part rather than all of the embodiments of the present disclosure. All other embodiments obtained by a person of ordinary skill in the art based on embodiments of the present disclosure without creative efforts should fall within the protection scope of the present disclosure.

Embodiment 1. Refer to FIG. 1 to FIG. 8. A flip-type cat litter box includes a cat litter box assembly 1 and a purification device 2. The cat litter box assembly 1 includes a stainless steel bottom bowl 11 and a top cover 12 of a cat litter box that is disposed on a top of the stainless steel bottom bowl 11. A pedal 13 is movably embedded on the top cover 12 of the cat litter box, the pedal 13 is internally provided with a through-hole 131, and a transparent door 14 is hinged at a bottom of one end of the pedal 13.

Figure 4:
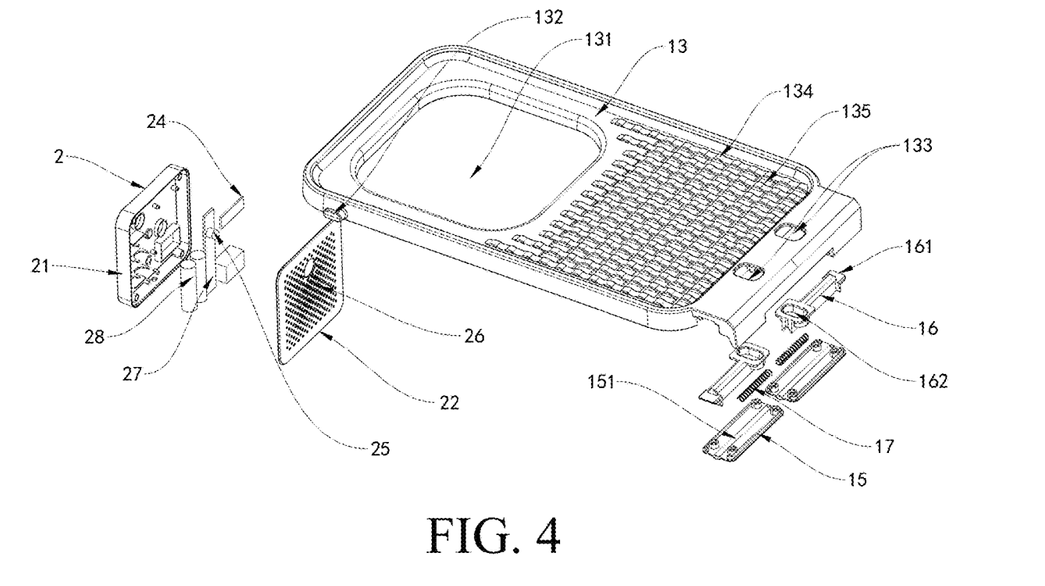
FIG. 4 is an exploded view of a structure of a purification device of a flip-type cat litter box according to the present disclosure.
Figure 8:
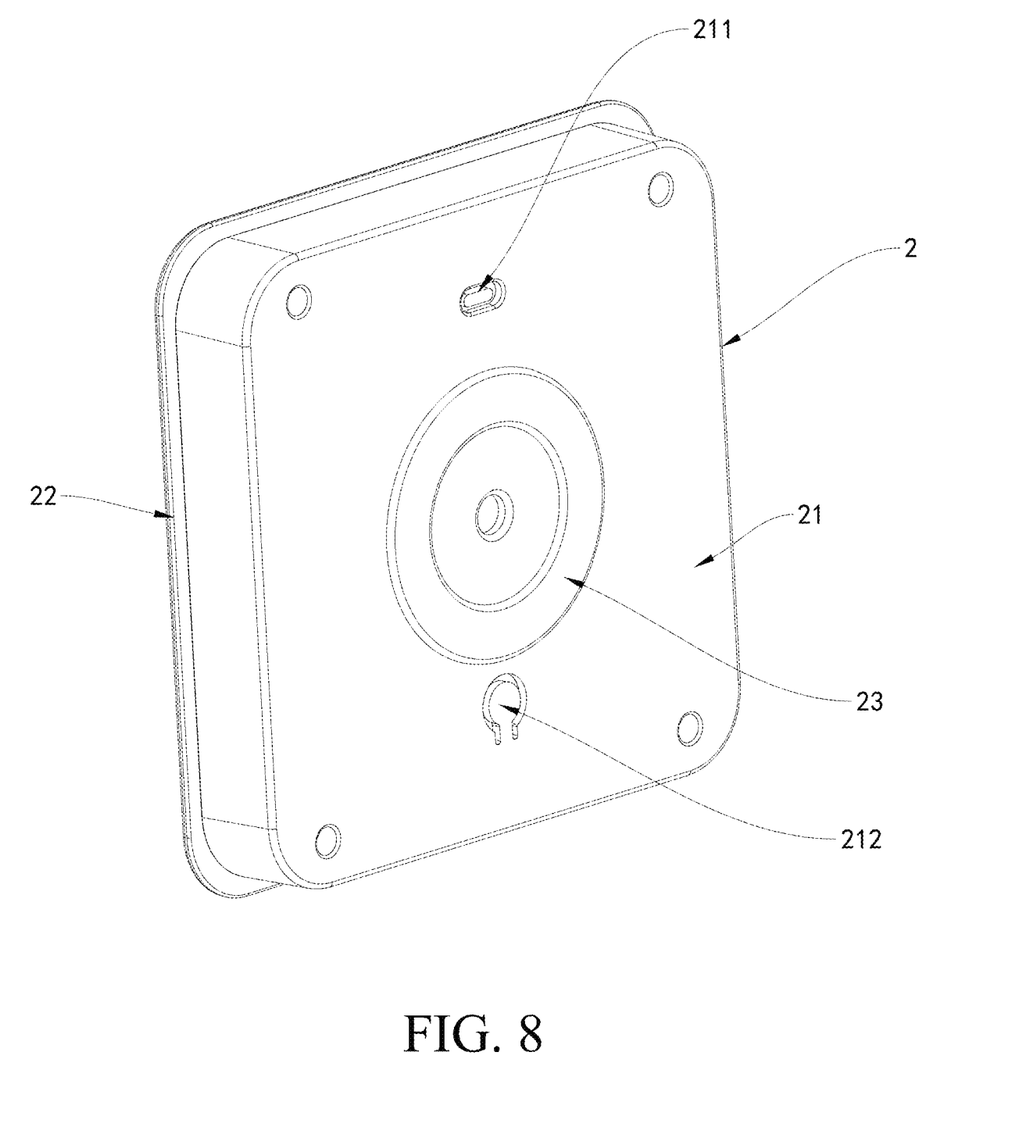
FIG. 8 is a lateral view of a structure of a purifier bottom shell of a flip-type cat litter box according to the present disclosure.
Figure 9:
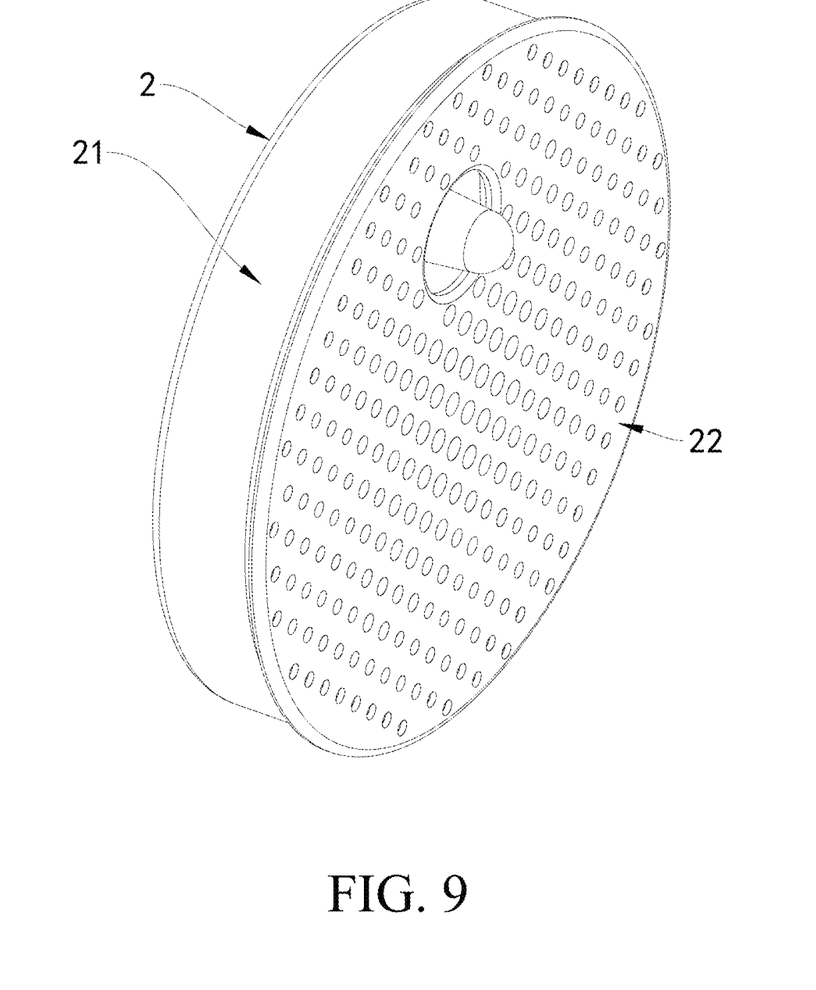
FIG. 9 is a schematic diagram of a structure of an embodiment 2 of a flip-type cat litter box according to the present disclosure.

The purification device 2 includes a purifier bottom shell 21 and a magnet 23 that is disposed on a side of the purifier bottom shell 21. The purifier bottom shell 21 is attached to a side of an inner wall of the top cover 12 of the cat litter box via the magnet 23 and an anion generator 24 and a sensor 25 are disposed inside the purifier bottom shell 21. The purification device 2 is attached to one side of the inner wall of the top cover 12 of the cat litter box via the magnet 23, may be independently removed for charging and overhauling, and does not need to be connected to a power source in use. This resolves a problem that there is no power supply at a position of the cat litter box. The anion generator 24 generates a trace of ozone while generating a large quantity of negative ions, to easily adsorb viruses and bacteria. This results in death of the viruses and bacteria due to a change in a structure or transfer of energy. In addition, electrode neutralization is performed between negative ions with negative charges and smoke and dust floating in the air with positive charges, to implement natural deposit. This implements a function of purifying the air. The sensor 25 is used to sense the cat entering the stainless steel bottom bowl 11. After a cat leaves, operations of sterilization and deodorization are performed immediately via the anion generator 24 and the sensor 25. This effectively resolves a problem of bacteria and odor of the cat litter box, so that the using is more sanitary.

Figure 1:
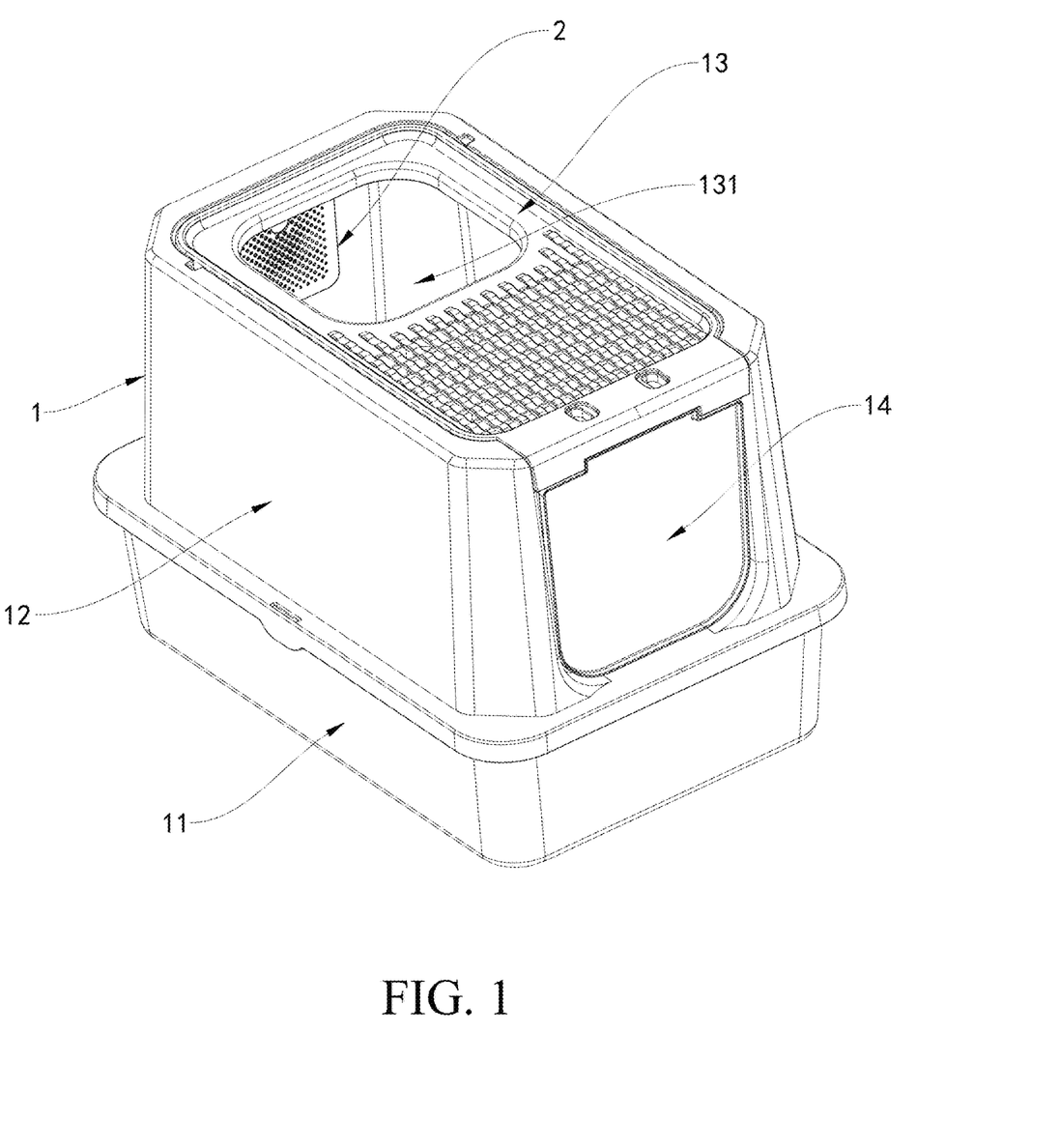
FIG. 1 is a schematic diagram of a structure of a flip-type cat litter box according to the present disclosure.
Figure 2:
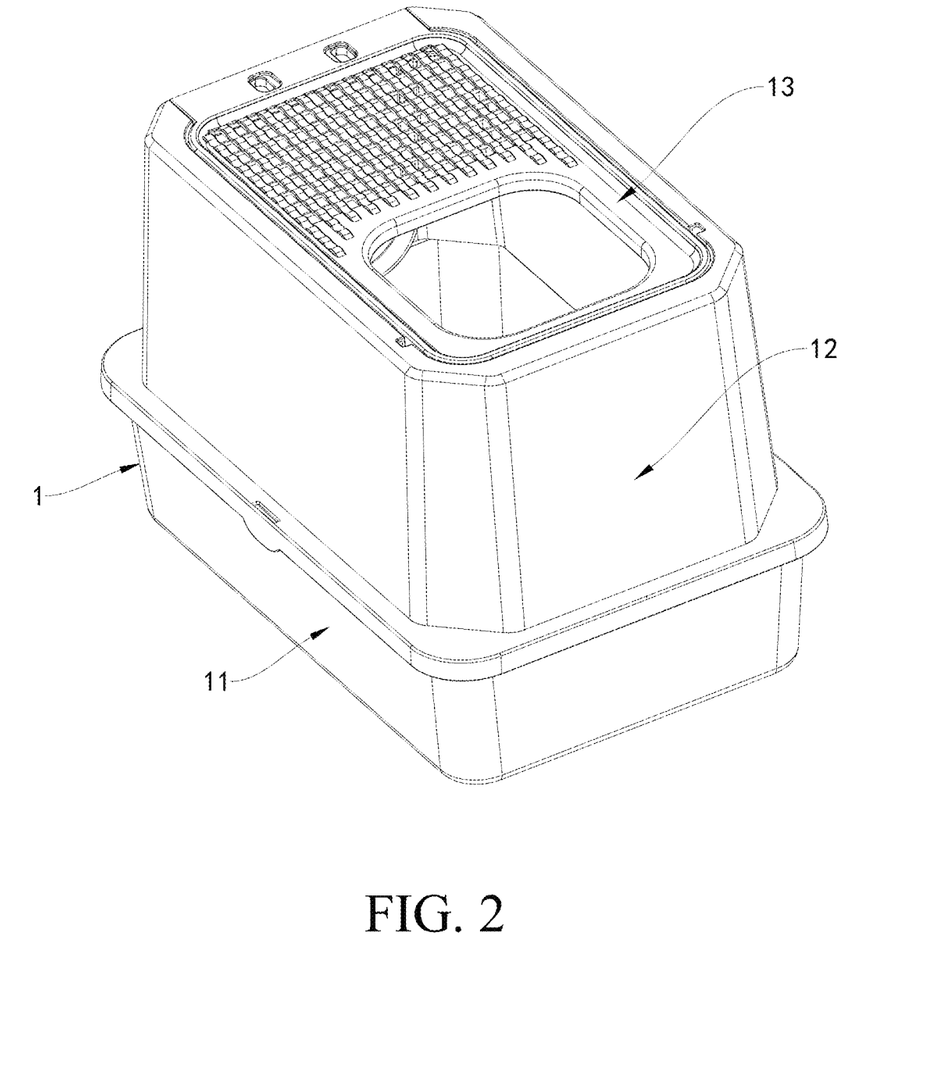
FIG. 2 is a lateral view of a cat litter box assembly of a flip-type cat litter box according to the present disclosure.
Figure 3:
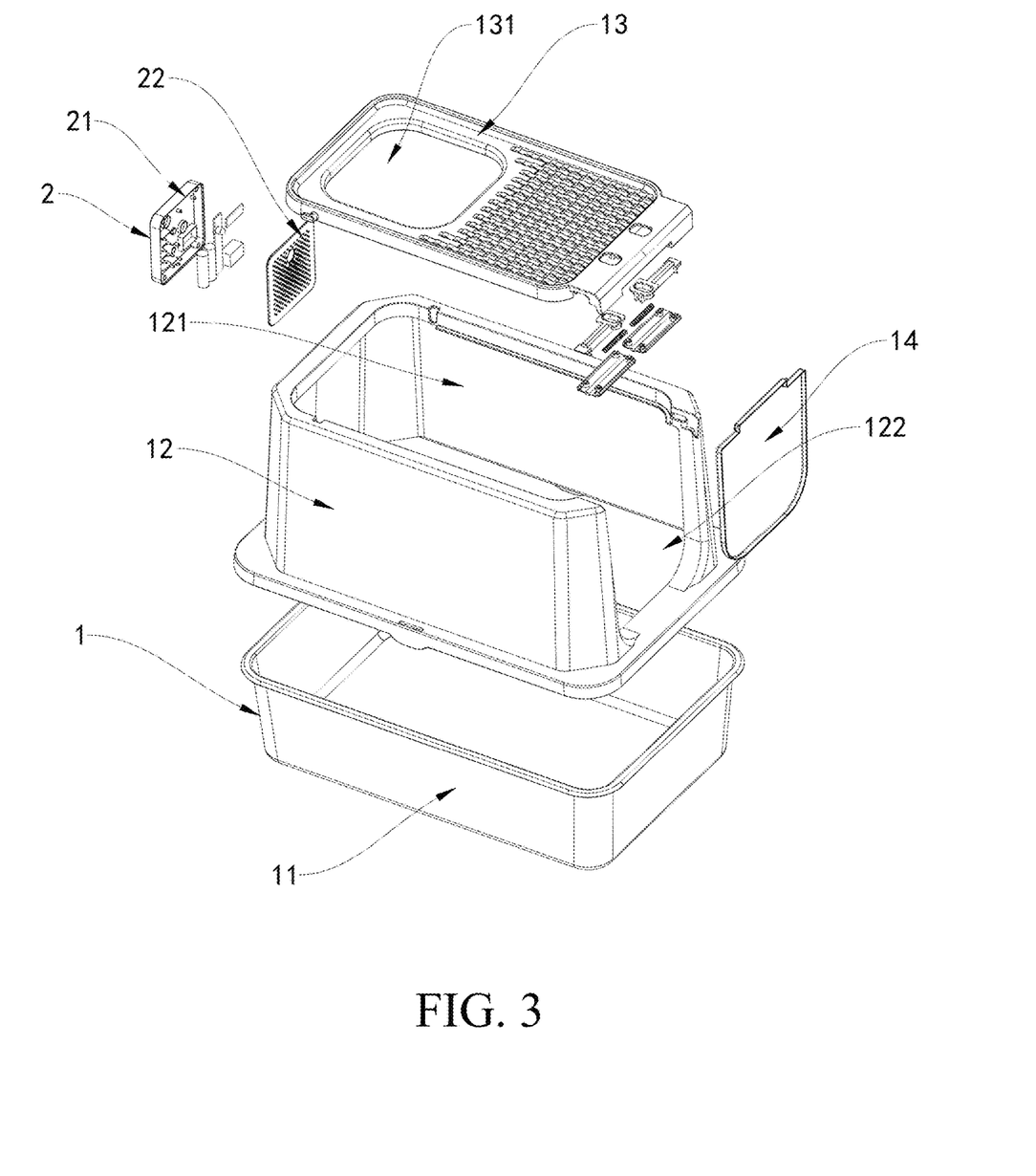
FIG. 3 is an exploded view of a structure of a cat litter box assembly of a flip-type cat litter box according to the present disclosure.

As a specific technical solution in this embodiment, a connection hole 121 is provided on a top of the top cover 12 of the cat litter box, the pedal 13 is movably embedded inside the connection hole 121, a door hole 122 is provided on a surface of the top cover 12 of the cat litter box, and a bottom end of the transparent door 14 extends inside the door hole 122. The cat may easily enter or exit the stainless steel bottom bowl 11 from the door hole 122. The cat may also easily enter or exit the stainless steel bottom bowl 11 from the through-hole 131 on the pedal 13.

Figure 5:
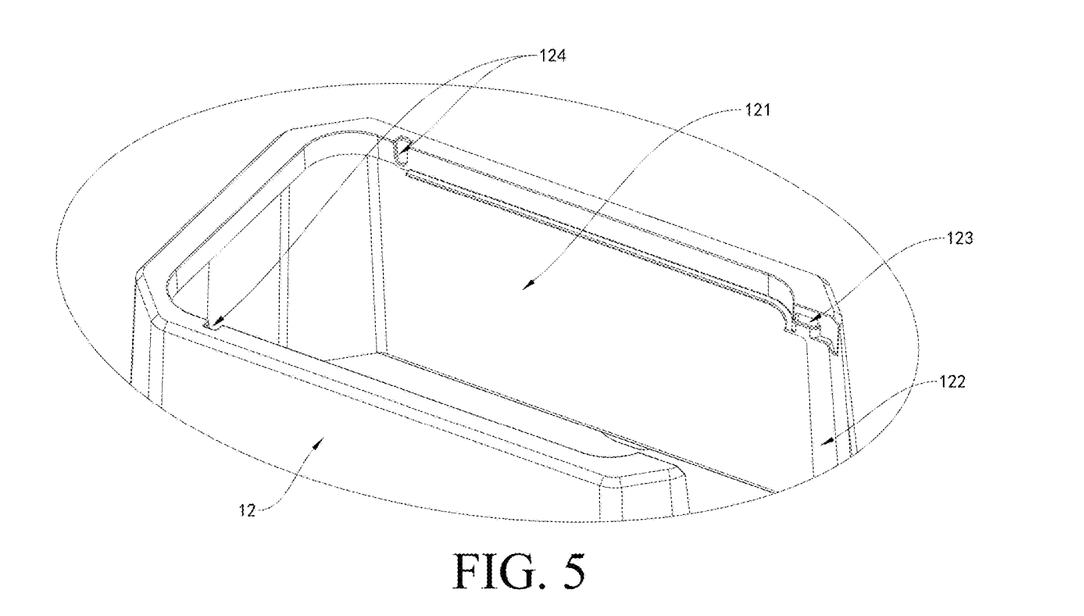
FIG. 5 is a schematic diagram of a structure of a lock hole of a flip-type cat litter box according to the present disclosure.

As a specific technical solution in this embodiment, the lock holes 123 are provided on both sides of one end of the connection hole 121, and positioning holes 124 are provided on both sides of the other end of the connection hole 121. Rotary shafts 132 are disposed on both sides of the pedal 13, the two rotary shafts 132 are respectively stuck into two positioning holes 124, and the rotary shafts 132 are L-shaped. The rotary shafts 132 match with the positioning holes 124, to further ensure stability of the pedal 13 when the pedal 13 is stowed inside the connection hole 121.

As a specific technical solution in this embodiment, two latch catch covers 15 are disposed at a bottom of the one end of the pedal 13, and a latch catch body 16 is movably disposed between the latch catch cover 15 and the pedal 13. A lock pin 161 that is inserted with a lock hole 123 is disposed at one end of the latch catch body 16, and a latch catch slot 162 is provided on a top of the other end of the latch catch body 16, and a latch catch hole 133 corresponding to the latch catch slot 162 is provided on a top of the one end of the pedal 13. An arc slot 151 is provided on a top of the latch catch cover 15, a spring 17 is movably embedded inside the arc slot 151, and a clamping slot 163 that is clamped with the spring 17 is provided at a bottom of the latch catch body 16. As shown in FIG. 1, FIG. 3 to FIG. 5, and FIG. 7, when the pedal 13 needs to be unlocked, a finger of the user is inserted inside the latch catch slot 162 via the latch catch hole 133, to toggle the latch catch slot 162 and drive the latch catch body 16 to move. This enables the latch catch body 16 to compress the spring 17 via the clamping slot 163, to drive the lock pin 161 to be disengaged from the inner part of the lock hole 123, unlock the pedal 13, and flap the pedal 13. The pedal 13 and the transparent door 14 are opened in a flap-type manner. After the pedal 13 is unlocked, the user pinches the latch catch hole 133 with a finger and upturns the pedal 13, to enable the pedal 13 to rotate with the rotary shaft 132 as the center of the circle. Because the rotary shaft 132 is L-shaped, when the rotary shaft 132 rotates by more than 90°, one end of the rotary shaft 132 is clamped with inner parts of the positioning holes 124, to enable the pedal 13 to keep tilted at the top of the top cover (12) of the cat litter box. In addition, a transparent door 14 and the pedal 13 are folded together. Therefore, space for the user to operate the stainless steel bottom bowl 11 is greatly improved, and the user can easily clean up cat litter and cat feces in the stainless steel bottom bowl 11. Due to the stainless steel bottom bowl 11, odor and the cat feces are not easy to left, so that the user can easily clean up the stainless steel bottom bowl, and the using is more sanitary.

Figure 6:
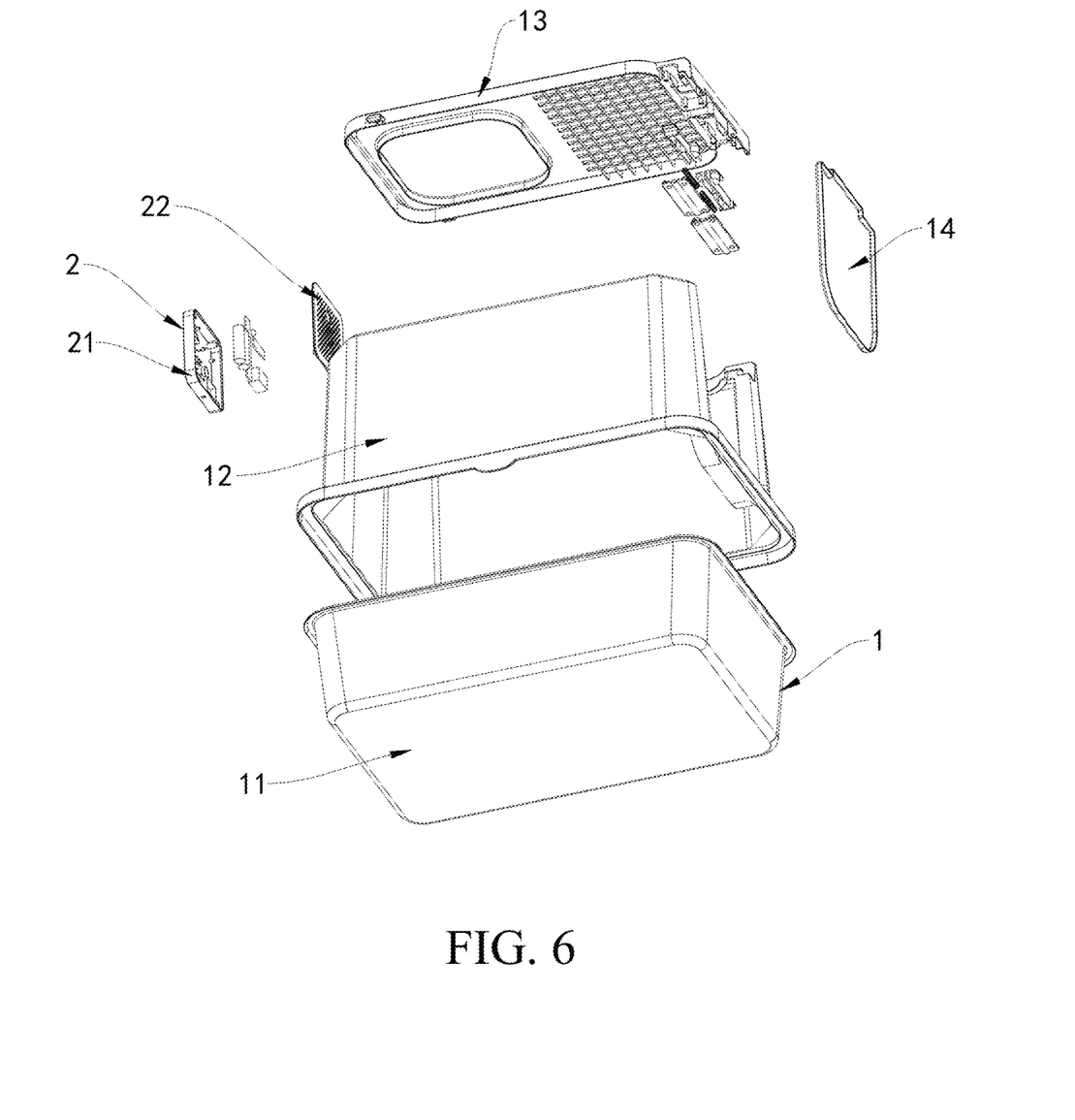
FIG. 6 is an exploded view of a structure of a cat litter box assembly of a flip-type cat litter box according to the present disclosure.
Figure 7:
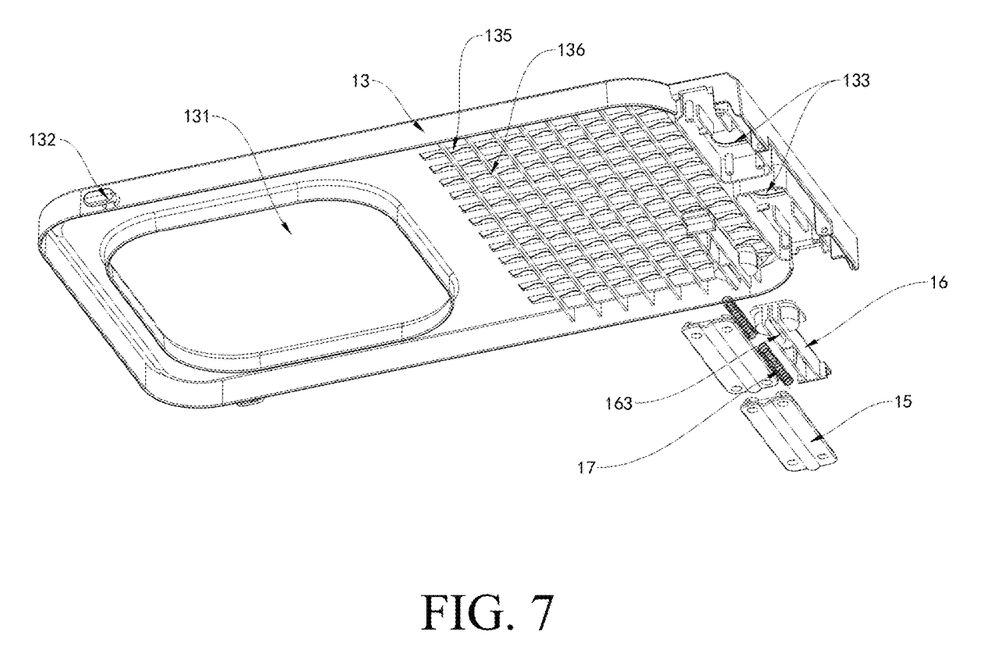
FIG. 7 is a schematic diagram of a structure of a clamping slot of a flip-type cat litter box according to the present disclosure.

As a specific technical solution in this embodiment, a plurality of corrugated strips 134 that are located on a side of the through-hole 131 are disposed on a top of the pedal 13, the pedal 13 is internally provided with an elongated hole 135 that is located between two adjacent corrugated strips 134, a plurality of reinforcing ribs 136 that are staggered from the corrugated strips 134 are disposed at the bottom of the pedal 13, and the corrugated strips 134 match with the elongated holes 135, which facilitates the cat to climb and the disposing of the reinforcing ribs 136.

As a specific technical solution in this embodiment, a purifier face cover 22 is disposed on the side of the purifier bottom shell 21, the purifier face cover 22 is internally provided with a plurality of ventilation holes 26, and one end of the sensor 25 penetrates through the purifier face cover 22 and extends inside the top cover 12 of the cat litter box. The purifier bottom shell 21 and the purifier face cover are squares.

As a specific technical solution in this embodiment, a charging switch circuit board 27 and a battery 28 that is electrically connected with the charging switch circuit board 27 are disposed inside the purifier bottom shell 21, and a charging interface 211 and a switch button 212 that correspond to the charging switch circuit board 27 are disposed on the side of the purifier bottom shell 21.

Embodiment 2. As shown in FIG. 1 to FIG. 9. Compared to the above embodiment, the purifier bottom shell 21 and the purifier face cover 22 in the present disco lure are round. Compared to the purifier bottom shell 21 and the purifier face cover 22, appearance is more beautiful and comfortable, and more choices are provided to the user.

In summary, according to the flip-type cat litter box, after a cat relieves the bowels in the stainless steel bottom bowl 11 and leaves, operations of sterilization and deodorization are performed immediately via the anion generator 24 and the sensor 25. This effectively resolves the problem of bacteria and odor of the cat litter box, so that the using is more sanitary. The user toggles the latch catch body 16 to unlock the pedal 13 and upturns the pedal 13, to enable the pedal 13 to keep tilted at the top of the top cover 12 of the cat litter box. In addition, a transparent door 14 and the pedal 13 are folded together. Therefore, space for the user to operate the stainless steel bottom bowl 11 is greatly improved, and the user can easily clean up cat litter and cat feces in the stainless steel bottom bowl. Due to the stainless steel bottom bowl 11, odor and the cat feces are not easy to left, so that the user can easily clean up the stainless steel bottom bowl, and the using is more sanitary.

It should be noted that terms "including", "comprising", or any other variants thereof are intended to cover non-exclusive inclusion, such that a process, method, article, or device including a series of elements includes not only those elements but also other elements not explicitly listed, or elements inherent to such a process, method, article, or device. In case there are no more restrictions, an element limited by the statement "including a . . ." does not exclude the presence of additional identical elements in the process, the method, the article, or the device that includes the element.

Although the embodiments of the present disclosure have been illustrated and described, it should be understood that those of ordinary skill in the art may make various changes, modifications, replacements and variations to the above embodiments without departing from the principle and spirit of the present disclosure, and the scope of the present disclosure is limited by the appended claims and their legal equivalents.

What it claimed is:

1. A flip-type cat litter box, comprising:
a stainless steel bottom bowl (11) and a top cover (12), wherein the top cover (12) of the cat litter box is disposed on a top of the stainless steel bottom bowl (11);
a pedal (13) movably embedded on the top cover (12) of the cat litter box capable of moving between an open and closed position, the pedal (13) internally provided with a through-hole (131) for ingress and egress of the litter box;
a transparent door (14) hinged at a bottom of a first end of the pedal (13);
two latch catch covers (15) disposed at the bottom of the first end of the pedal (13),
a latch catch body (16) movably disposed between a first latch catch cover of the two latch catch covers (15) and the pedal (13),
an arc slot (151) provided on a top surface of the first latch catch cover (15),
a spring (17) movably embedded inside the arc slot (151), and
a clamping slot (163) clamped with the spring (17) wherein the clamping slot is provided on a bottom surface of the latch catch body (16); and
a purification device (2) comprising a purifier bottom shell (21), a magnet (23) disposed on a side of the purifier bottom shell (21), an anion generator (24) disposed in the purifier bottom shell (21), and a sensor (25) disposed in the purifier bottom shell (21) wherein the purifier bottom shell (21) is attached to a side of an inner wall of the top cover (12) of the cat litter box via the magnet (23).

* * * * *